Patented Oct. 13, 1925.

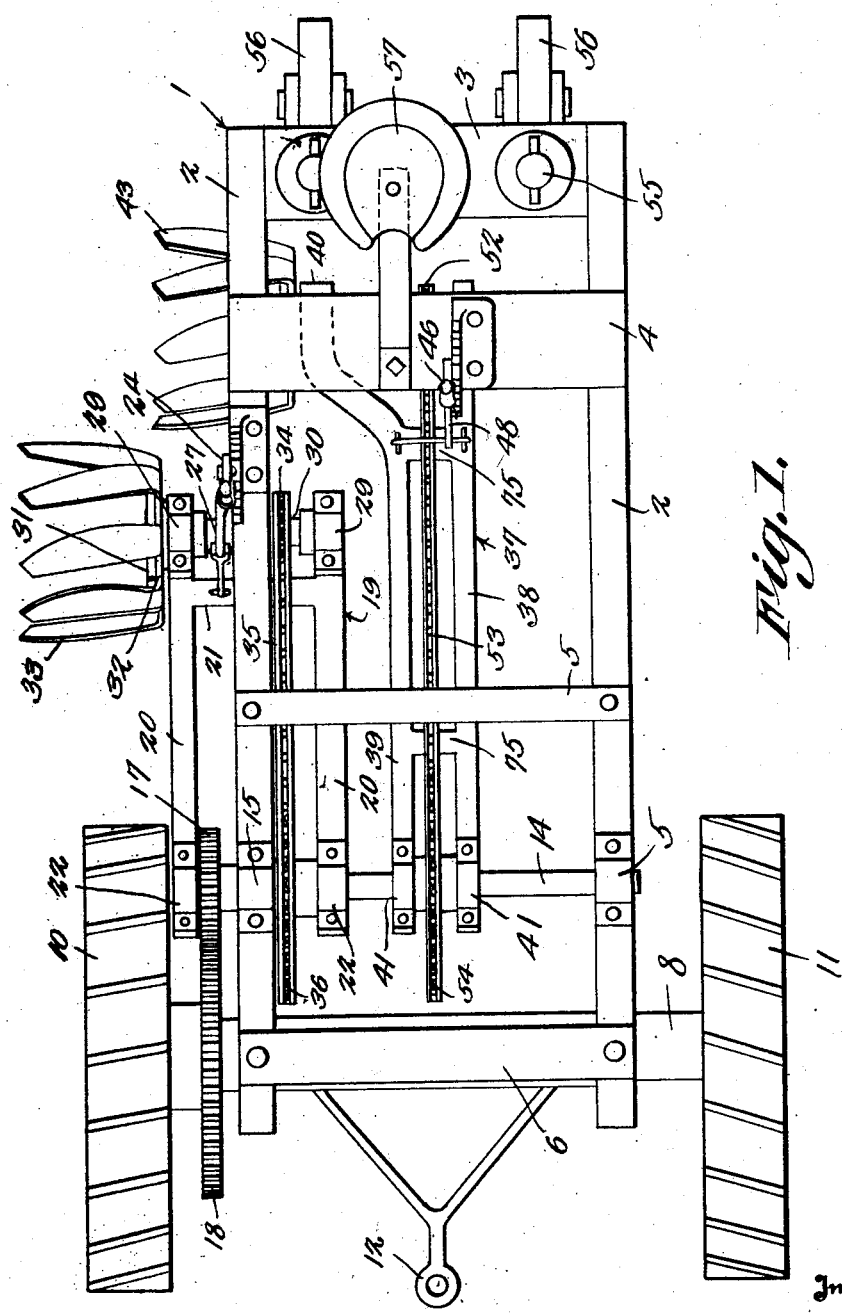

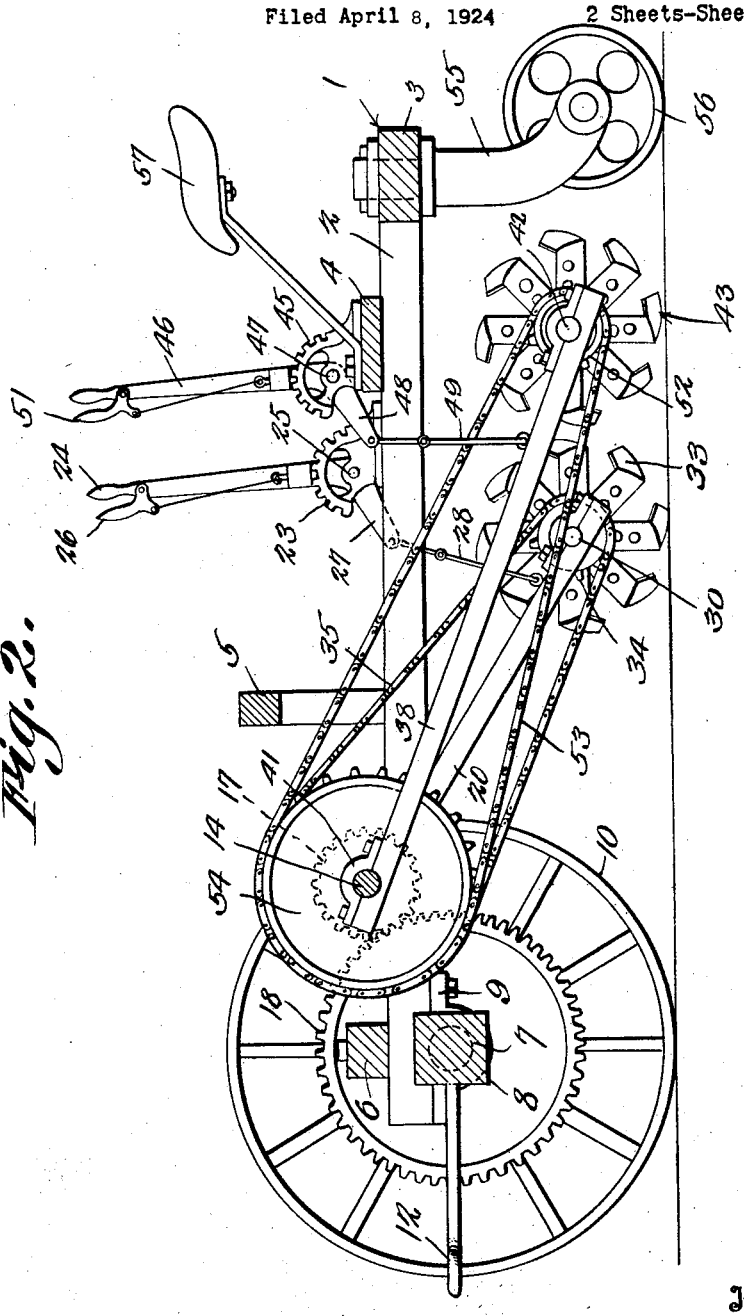

1,556,643

UNITED STATES PATENT OFFICE.

OAK B. SPRAGGINS, OF HALEYVILLE, ALABAMA.

FARM MACHINE.

Application filed April 8, 1924. Serial No. 705,030.

*To all whom it may concern:*

Be it known that I, OAK B. SPRAGGINS, a citizen of the United States, residing at Haleyville, in the county of Winston and State of Alabama, have invented a new and useful Farm Machine, of which the following is a specification.

This invention aims to provide simple means for breaking up and cutting the surface of the soil, through the instrumentality of rapidly rotating members which may be raised and lowered at the will of an operator, novel means being supplied for carrying out the results above mentioned.

In the drawings:

Figure 1 is a plan and Figure 2 is a longitudinal section. In carrying out the invention, there is provided a main frame 1 including side bars 2 connected by a rear cross bar 3, a cross piece 4 located in front of the cross bar 3, an arched brace 5 located in front of the cross piece 4, and a front cross bar 6. The reduced ends 7 of an axle 8 are held by brackets 9 on the forward ends of the side bars 2. On the axle end 7, ground wheels 10 and 11 are mounted for rotation. The axle 8 is supplied with any suitable means 12 whereby the machine may be connected to a tractor or to anything else whereby the machine is drawn along.

A shaft 14 is journaled for rotation in bearings 15 located on the side bars 2 of the main frame 1 near to the forward end of the main frame. The shaft 15 carries a gear wheel 17, meshing with a gear wheel 18 connected to the ground wheel 10, to rotate therewith.

An H-shaped radius arm 19, is provided. The radius arm 19 comprises side members 20 connected adjacent to their forward ends by a cross piece 21. The side members 20 of the radius arm 19 are supplied with bearings 22, mounted on the shaft 14. One side member of the radius arm 19 is located outside of one side bar 2 of the main frame 1, and the other side member of the radius arm 19 is located inside of the said side bar, as clearly shown in Figure 1 of the drawings. The radius arm, obviously, is mounted for vertically swinging movement on the shaft 14. A segment 23 is mounted on the said side bar 2. A lever 24 is fulcrumed at 25 on the segment 23 and has a latch mechanism 26 adapted to cooperate with the segment. The lever 24 is in the form of a bell crank lever, and includes a forwardly extended arm 27, united by a flexible connection 28 with the cross piece 21 of the radius arm 19. The forward ends of the side member 20 of the radius arm 19 carry bearings 29, in which a shaft 30 is journaled for rotation. The outer end of the shaft 30 carries a rotatable soil-engaging member including a head 31 having outwardly extended arms 32 terminating in laterally projecting cutters 33. A sprocket wheel 34 is secured to the shaft 30 and is located between the forward ends of side members 20 of the radius arm 19. About the sprocket wheel 34 is trained a sprocket chain 35, engaged about a sprocket wheel 36 which is secured to the shaft 14.

The numeral 37 designates a second radius arm made up of side members 38 and 39, connected by cross bars 75. The side member 38 is straight throughout its length, whereas the side member 39 has a laterally extended rear end 40. Bearings 41 are mounted on the forward ends of the side members 38 and 39 of the radius arm 37 and engage the shaft 14, the construction being such that the radius arm 37 can be raised and lowered. The radius arm 37 is disposed between the side bars 2 of the main frame 1. A shaft 42 is journaled in the rear end of the side member 38 of the radius arm 37 and in the laterally offset end 40 of the side member 39. A soil engaging element 43 is mounted on the outer end of the shaft 42. The soil engaging element 43 need not be described in detail, because it is constructed like the soil engaging element 31—32—33. Owing to the fact that the member 39 of the radius arm 37 is offset as shown at 40, the bearings 44 which carry the shaft 42 may be disposed at some distance apart thereby affording a secure rotatable mounting for the shaft 42. The soil engaging element 43 is so located that it operates just inside of the soil engaging element 31—32—33, the width of the strip of soil operated upon being increased accordingly.

A segment 45 is mounted on the cross piece 4. A lever 46 is fulcrumed at 47 on the segment 45 and has a forwardly extended arm 48 united by a flexible connection 49 with the side members 39 and 38 of the radius arm 37 in alinement with one of the two cross pieces 75 which connect the members 39 and 38 of the radius arm 37. The lever 46 carries a latch mechanism 51 adapted to cooperate with the segment 45. A sprocket wheel 52 is mounted on the shaft 42. About the sprocket wheel 52, a sprocket chain 53 is engaged, the sprocket chain being engaged about a sprocket wheel 54 on the shaft 14.

In practical operation, the ground wheel 10 rotates the gear wheel 18, and the gear wheel 18 rotates the gear wheel 17, rapid rotation being imparted to the shaft 14, because the diameter of the gear wheel 18 is considerably greater than the diameter of the gear wheel 17. When the shaft 14 is rotated, the sprocket wheel 36, the chain 35 and the sprocket wheel 34 impart rapid rotation to the shaft 20 and to the soil engaging element 31—32—33, the effect of the rotatable soil engaging element being clear to those skilled in the art. In a similar way, the sprocket wheel 54, the chain 53, and the sprocket wheel 52 rotate the shaft 42 and the soil engaging element 43, the soil engaging element 43 operating inside of the path of the soil engaging element 31—32—33, and causing the machine to cut the surface of the soil throughout a strip which is twice the width of either soil engaging element. The machine, although moving forward at a slow rate of speed, will produce a rapid rotation in the soil engaging elements, owing to the nature of gearing employed.

Through the instrumentality of the levers 24, the radius arm 19 may be raised and lowered, and by way of the lever 46, the radius arm 37 may be raised and lowered, thereby adjusting the respective cutting elements with regard to the surface of the soil. When the occasion for the use of the device has passed, the radius arm 19 and 37 may be swung upwardly at their rear ends, and the arched brace 5 affords room for the sprocket chains 52 and 35, when the radius arms are raised.

The rear end of the machine may be supported in any desired way. Preferably, however, the upper ends of rearwardly inclined standards 55 are mounted to turn in the rear cross bar 3, the standards carrying castor wheels 56. A seat 57 is mounted on the cross piece 4, and the seat is so located that an occupant thereof may handle the levers 24 and 46 without difficulty.

I desire it to be understood that I reserve the right to change the construction of my invention, so long as such may come under the appended claims.

Having thus described the invention, what is claimed is:—

1. In a device of the class described, a frame, a ground wheel journaled on the frame, radius arms mounted to swing vertically on the frame, means for swinging the radius arms vertically, one radius arm being of greater length than the other, soil engaging members journaled on the radius arms, the soil engaging member of one radius arm being located in alinement with the other radius arm and inwardly of the soil engaging member of said other radius arm, and means for connecting the soil engaging members operatively with the ground wheel.

2. In a device of the class described, a frame, a ground wheel journaled on the frame, radius arms mounted to swing vertically on the frame, one radius arm being of greater length than the other, means for swinging the radius arms vertically, laterally projecting soil-engaging members journaled on the radius arms, the soil-engaging member of one radius arm being disposed in posterio-lateral position with respect to the soil-engaging member of the other radius arm, the inner end of one soil-engaging member being so disposed with respect to the outer end of the other soil-engaging member that the soil-engaging members cooperate to sweep a transversely continuous area, and means for connecting the soil-engaging members operatively with the ground wheel to rotate them.

In testimony that I claim the foregoing as my own I have hereto affixed my signature.

OAK B. SPRAGGINS.